(12) United States Patent
Augenstein et al.

(10) Patent No.: US 7,380,728 B2
(45) Date of Patent: Jun. 3, 2008

(54) HEATING DEVICE FOR MOTOR VEHICLES

(75) Inventors: Claus Augenstein, Gerlingen (DE); Ralf Maus, Korntal-Münchingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 118 days.

(21) Appl. No.: 10/509,739

(22) PCT Filed: May 7, 2003

(86) PCT No.: PCT/EP03/04763

§ 371 (c)(1),
(2), (4) Date: Sep. 30, 2004

(87) PCT Pub. No.: WO03/099596

PCT Pub. Date: Dec. 4, 2003

(65) Prior Publication Data

US 2005/0199207 A1   Sep. 15, 2005

(30) Foreign Application Priority Data

May 24, 2002   (DE) ................................ 102 22 947

(51) Int. Cl.
*B60H 1/02* (2006.01)
(52) U.S. Cl. ...................... 237/12.3 B; 237/12.3 R; 165/41
(58) Field of Classification Search .......... 237/12.3 B, 237/12.3 R; 165/41, 42
See application file for complete search history.

(56) References Cited

U.S. PATENT DOCUMENTS

| | | | | |
|---|---|---|---|---|
| 3,731,729 A * | 5/1973 | Beatenbough et al. ...... 165/204 |
| 4,106,472 A * | 8/1978 | Rusk ........................... 123/205 |
| 4,308,994 A * | 1/1982 | Perhats .................... 237/12.3 B |
| 4,493,293 A * | 1/1985 | Paul et al. ................ 123/41.12 |
| 4,501,231 A * | 2/1985 | Perkins ......................... 122/26 |
| 4,974,778 A | 12/1990 | Bertling |
| 4,993,377 A | 2/1991 | Itakura |
| 5,683,031 A * | 11/1997 | Sanger ........................ 237/1 R |
| 5,743,467 A * | 4/1998 | Ban et al. ............... 237/12.3 R |
| 5,791,558 A * | 8/1998 | Hoshino et al. ........ 237/12.3 B |
| 5,979,163 A * | 11/1999 | Hanners et al. ................ 60/571 |
| 6,039,007 A * | 3/2000 | Ban et al. ...................... 122/26 |
| 6,244,232 B1 * | 6/2001 | Ban et al. ............. 123/142.5 R |
| 6,325,298 B1 * | 12/2001 | Hielm .................... 237/12.3 R |
| 6,388,346 B1 * | 5/2002 | Lopatinsky et al. ........... 310/63 |
| 6,489,598 B1 * | 12/2002 | Hielm ......................... 219/631 |
| 6,900,561 B2 * | 5/2005 | Vlemmings et al. ........... 310/59 |

FOREIGN PATENT DOCUMENTS

| | | |
|---|---|---|
| DE | 196 31 722 A1 | 2/1998 |
| DE | 199 06 361 A1 | 8/1999 |
| EP | 0 361 053 B1 | 1/1994 |

\* cited by examiner

*Primary Examiner*—Derek S Boles
(74) *Attorney, Agent, or Firm*—Foley & Lardner LLP

(57) ABSTRACT

The invention relates to a heating device for motor vehicles with an internal combustion engine and a coolant circuit. The heating device (1) comprises a heat-generation compartment (2) with a cooling jacket (6) around which a coolant flows, and a rotor (13) mounted on a drive shaft (9). The cooling jacket (6) is part of a cooling chamber (3) that comprises a coolant inlet (4) and a coolant outlet (5). A pump wheel (17) is disposed in the cooling compartment (3), is driven by the drive shaft (9) and circulates the coolant.

17 Claims, 1 Drawing Sheet

HEATING DEVICE FOR MOTOR VEHICLES

The invention relates to a heating device for motor vehicles with an internal combustion engine and with a coolant circuit.

Heating devices of this type for motor vehicles are known as additional heating systems for engines with optimized consumption which do not make sufficient heat available for heating the passenger space. The heat which is required for the additional heating may be generated in various ways, for example by fluid friction; such an additional heating device, also referred to as accessory heater, is described in U.S. Pat. No. 4,993,377. A rotor rotates in a heat generation chamber filled with silicone oil and surrounded by a cooling jacket and is driven, as required, from the internal combustion engine via a belt drive by means of a magnetic clutch. The heat generated by fluid friction is transmitted to the coolant which flows around the cooling jacket and which thus passes into the coolant or heating circuit of the motor vehicle. The heated coolant flows through a heating body which supplies the passenger space of the motor vehicle with heated air. The circulation of the coolant through the cooling circuit and the heating circuit takes place by means of the coolant pump driven by the internal combustion engine. The additional heating device through which the coolant has flowed and also its supply and discharge lines increase the coolant-side pressure loss of the coolant circuit and require a relatively large dimensioning of the coolant pump.

In a similar additional heating device according EP-A 0 361 053, it was therefore proposed to incorporate into the heating circuit an additional pump for conveying the coolant through the additional heating device and the heating body. In contrast to the main pump which is driven mechanically by the engine, the additional conveying pump possesses an electric drive which loads the on-board network.

The object of the present invention is, for a heating device of the type initially mentioned, to minimize the coolant-side pressure loss and to avoid cost-intensive and energy-consuming additional pumps.

According to an embodiment, a pump wheel is integrated into the cooling chamber of the heating device, through which cooling chamber the coolant has flowed, the coolant-side pressure drop of this additional heating device is minimized. The pump wheel is driven via the drive shaft, on which the rotor is also fastened, and therefore has a favorable drive efficiency. The structural and cost-related outlay for the pump wheel is low, that is to say there are scarcely any additional costs for the heating device. Moreover, the arrangement of the pump wheel in the cooling chamber permits a streamlined flow through the cooling chamber and consequently an effective transmission of heat to the coolant.

According to further embodiments, the pump wheel is mounted rotatably on a protuberance of the cooling jacket coaxially to the drive shaft, specifically in alignment with the coolant inlet connection piece, so that the flow impinges onto the pump wheel axially. The cooling chamber and heat generation chamber are separated hermetically from one another, and the drive from the drive shaft to the pump wheel therefore takes place contactlessly, that is to say magnetically. For this purpose, permanent magnets are arranged both on the shaft end of the drive shaft and in the hub of the pump wheel, so that the magnetic field rotating due to the rotation of the drive shaft takes up the pump wheel. The magnetic lines in this case pass through the thin wall of the nonmagnetizable material of the protuberance. The pump wheel may alternatively also be produced from a magnetizable plastic, so that equipping it with permanent magnets may be dispensed with.

In a further advantageous refinement, both the cooling jacket and the cooling chamber have axially oriented cooling ribs which form spirally arranged cooling ducts. This ensures a controlled coolant flow from the coolant inlet connection piece via the pump wheel radially outward as far as the coolant outlet connection piece. At the same time, the cooling jacket, which is in heat exchange with the heat generation chamber, is washed around by the coolant over its entire area, thus giving rise to good heat transmission.

According to an advantageous refinement of the invention, the heat generation chamber is filled with a silicone oil, and the heat is generated on the principle of fluid friction, that is to say by the shearing of the viscous medium between the rotor and the stationary cooling jacket. This type of heat generation for additional heating systems of motor vehicles has proved advantageous and cost-effective. However, an alternative type of heat generation would also be conceivable, for example by means of eddy currents.

An exemplary embodiment of the invention is illustrated in the drawing and is described in more detail below.

Figure 1:
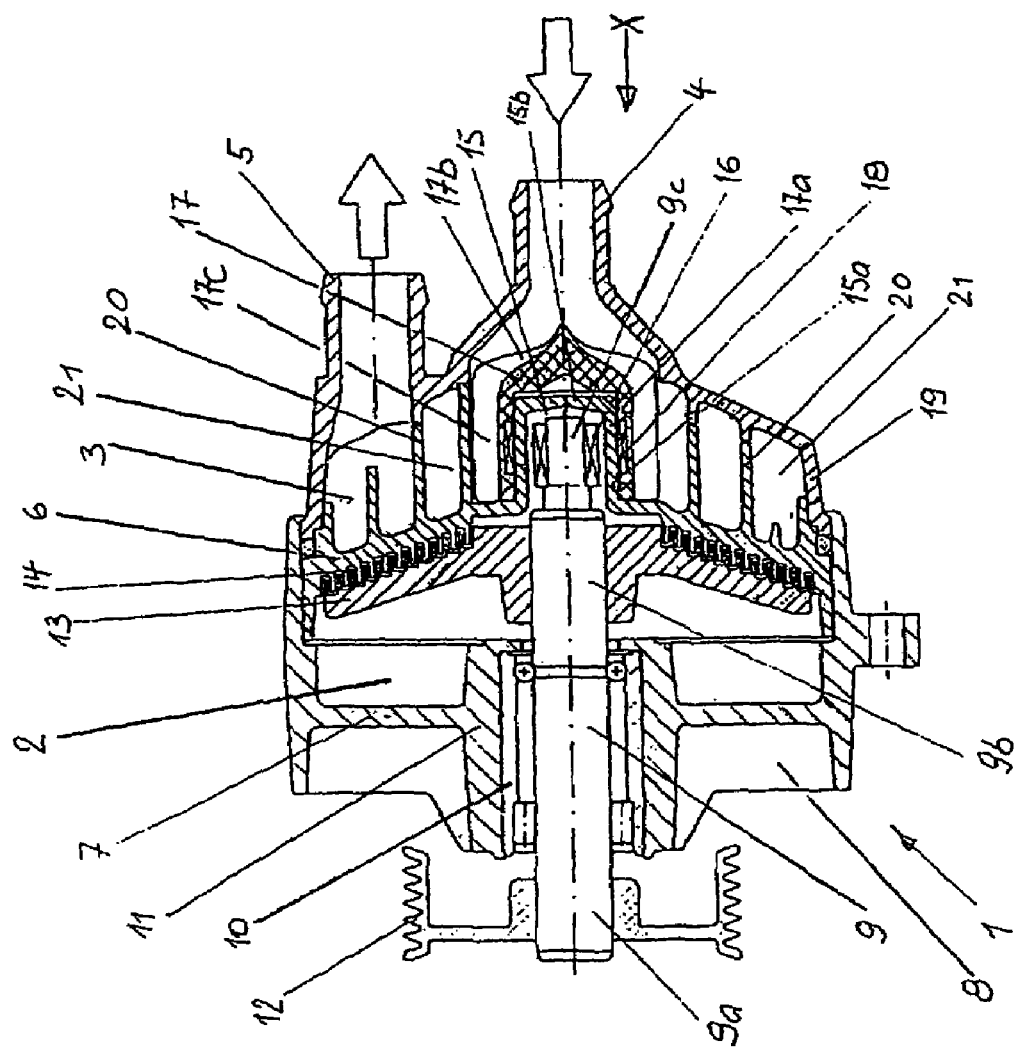
FIG. 1 shows the heating device with an integrated pump wheel in section.

FIG. 1 shows a heating device for a motor vehicle, not illustrated, with an internal combustion engine which is cooled by means of a coolant circuit, likewise not illustrated. This coolant circuit has connected to it a heating circuit, likewise not illustrated, in which is located a heating body for heating the passenger space of the motor vehicle, the coolant flowing through said heating body. The heating device 1 consists of a heat generation chamber 2 and of a cooling chamber 3 which are connected via a coolant inlet connection piece 4 and a coolant outlet connection piece 5 to the coolant circuit of the motor vehicle, that is to say are incorporated into the heating forward flow or return flow of the heating circuit. The heat generation chamber 2 is delimited by a cooling jacket 6 and a housing wall 7 of a bearing housing 8 which is fastened to the engine block of the motor vehicle in a way not illustrated. A drive shaft 9 is received rotatably in a hub 11 of the bearing housing 8 via a rolling bearing 10. A shaft end 9a projects beyond the bearing 10 and carries a belt pulley 12 which is connected mechanically to the crankshaft of the internal combustion engine via a belt drive, not illustrated. A rotor 13 is fastened fixedly in terms of rotation on a shaft portion 9b projecting into the heat generation chamber 2. In the exemplary embodiment in the drawing, the rotor 13 is also fixed axially on the drive shaft 9, but it may also be arranged so as to be axially displaceable. The rotor 13 has, on its side facing the cooling jacket 6, annular ribs and grooves which are in engagement with corresponding annular ribs and grooves of the cooling jacket 6 and form a labyrinth-shaped operating gap 14. The heat generation chamber 2 is filled with a viscous medium, that is to say silicone oil of a defined viscosity, to an extent such that the operating gap 14 is likewise filled with silicone oil. The cooling jacket 6 is inserted fixedly in terms of rotation and sealingly into the bearing housing 8 and in its central region has a protuberance 15 which is oriented coaxially to the drive shaft 9 and which is of pot-shaped design and has a cylindrical part 15a and a plane end part 15b. The cooling jacket 6 with the protuberance 15 thus separates the heat generation chamber 2 filled with silicone oil hermetically from the cooling chamber 3 through which coolant flows. The drive shaft 9 is prolonged via the portion 9b, which carries the rotor 13, into the protuberance 15 and there forms a shaft stub 9c, on the circumference of which are fastened permanent magnets 16. The cylindrical part 15a of the protuberance 15 has mounted rotatably on it a pump wheel 17; the latter has a hub 17a, in which permanent magnets 18 are fastened, distributed over the circumference, specifically radially in alignment with the permanent magnets 16 on the shaft stub 9c. The pump wheel 17 is designed as an axial/radial wheel, that is to say it has an axial flow impingement region 17b and a radial flow discharge region 17c with corresponding radial blading. The cooling space 3 is formed of the cooling jacket 6 and a housing cover 19 which is likewise inserted sealingly into the bearing housing 3 and contains the coolant inlet and outlet connection pieces 4, 5. Within the cooling chamber 3 are arranged cooling ribs 20 which run annularly to spirally and which form from the inside outward cooling ducts 21 running approximately spirally.

Figure 2:
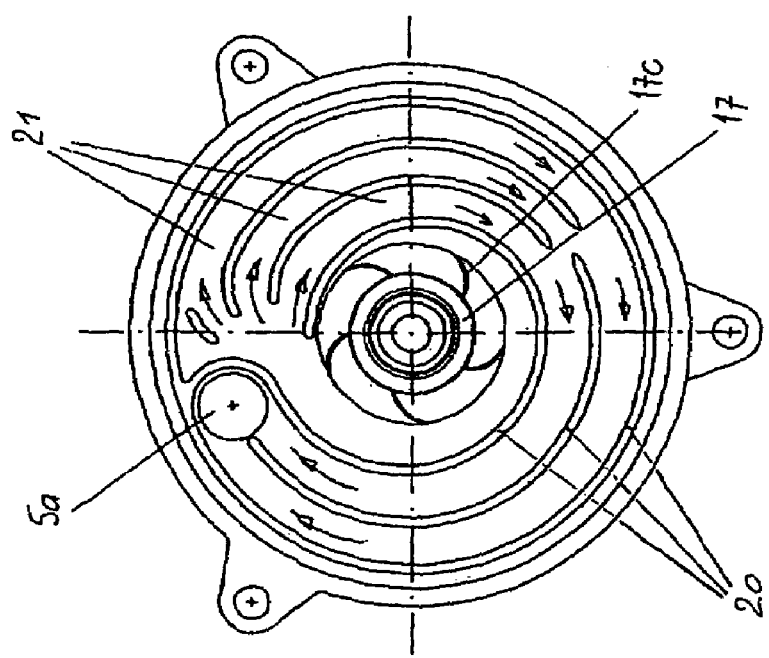
FIG. 2 shows a view in the direction X of the pump wheel of the heating device.

FIG. 2 shows a view in the direction X of the cooling jacket 6 with the cooling ribs 20 and with the cooling ducts 21, in which the coolant conveyed by the pump wheel 17 flows radially from the inside outward, this being indicated by direction arrows. The coolant thus sweeps over the entire surface of the cooling jacket 6 before it leaves the cooling chamber 3 via the outlet connection piece 5.

The heating device 1 functions as follows: when the coolant temperature is low and there is a requirement for heating the passenger space of the motor vehicle, the heating device 1, which, as mentioned initially, functions as an additional heating system, is put into operation. This may take place, for example, by means of an electromagnetic clutch, not illustrated here, but known from the prior art, which connects the drive shaft 9 to the belt pulley 12 which is itself driven mechanically by the internal combustion engine. On the other hand, it is also possible for the heating device to be put into operation by the hydraulic filling of the operating space. By means of the silicone oil located in the operating gap 14, heat is generated by fluid friction as a result of the relative rotational speed between the rotor 13 and housing jacket 6 and is transmitted directly via the cooling jacket 6 and its cooling ribs 20 to the coolant flowing through the cooling ducts 21. The coolant emerging from the outlet connection piece 5 therefore has a higher temperature than the coolant entering through the inlet connection piece 4. The shaft stub 9c and the permanent magnets 16 arranged on its circumference rotate synchronously with the drive shaft 9 and thus generate a rotating magnetic field which passes through the thin-walled, nonmagnetizable cylindrical part 15a of the protuberance 15. This rotating magnetic field takes up the permanent magnets 18 in the hub 17a of the pump wheel 17, so that the pump wheel 17 is set in rotation, with a slight slip in relation to the drive shaft 9.

As a result of the rotation of the pump wheel 17, the latter sucks in coolant from the coolant inlet connection piece 4 in the axial direction and conveys this coolant radially outward into the cooling ducts 21, thus ensuring a uniform flow over the cooling jacket 6. The coolant finally passes into the radially outer outlet region 5a of the cooling chamber 3 and from there into the outlet connection piece 5. The heated coolant passes from the latter into the heating forward flow, not illustrated, and from there into the heating body, likewise not illustrated, which then heats the air conveyed through it in order to heat the passenger space. The circulation of the coolant in the heating circuit, that is to say the overcoming of the line resistances and the flow resistance in the cooling space 3 of the heating device 1, thus takes place by means of the pump wheel 17 driven by the drive shaft 9. The main coolant pump is to that extent freed of this conveying work.

When the coolant is sufficiently heated and there is no longer any heating requirement, the heating device 1 is switched off, for example by means of the electromagnetic clutch initially mentioned or a hydraulical emptying of the operating space.

The drive of the pump wheel may, in principle, also take place in another way, that is to say by means of a nonmagnetic drive, for example the cooling jacket 6 could have in its central region, instead of the protuberance 15, a perforation through which the shaft stub 9c is led and is sealed off. The pump wheel 17 could then be fastened directly on the shaft stub 9c. The permanent magnets could thus be dispensed with, and, instead, a seal for sealing off the drive shaft 9 in relation to the cooling jacket 6 would be required, so that no silicone oil penetrates from the heat generation chamber into the cooling chamber or no coolant penetrates into the heat generation chamber 2.

The invention claimed is:

1. A heating device for a motor vehicle that includes an internal combustion engine and an engine coolant circuit, the heating device comprising:
    a housing defining a heat generation chamber,
    a rotor mounted in the heat generation chamber for rotation on a drive shaft,
    a cooling jacket defining a cooling chamber in heat exchange relationship with the heat generation chamber, the cooling chamber being adapted for circulating the engine coolant and including a coolant inlet and a coolant outlet, wherein the cooling chamber has a portion that extends in a radial direction of the heating device to substantially the same extent as the heat generation chamber and is axially adjacent to the heat generation chamber, and
    a pump wheel driven by the drive shaft, wherein the pump wheel is arranged in said portion of the cooling chamber and is configured to circulate coolant within the cooling chamber,
    wherein the cooling jacket comprises cooling ribs that form cooling ducts for the coolant, wherein the cooling ducts run radially outward in approximate spirals from the pump wheel, and wherein the pump wheel is arranged longitudinally in a center of the spirals.

2. The device as claimed in claim 1, wherein the cooling jacket has a central protuberance which is arranged coaxially to the drive shaft, wherein the pump wheel is arranged on one side of the central protuberance along an axial direction of the heating device and an axial end of the drive shaft is arranged on another side of the central protuberance.

3. The device as claimed in claim 2, wherein the pump wheel is magnetically driven by the axial end of the drive shaft.

4. The device as claimed in claim 3, wherein permanent magnets are fastened on a circumference of a shaft stub at the axial end of the drive shaft.

5. The device as claimed in claim 3, wherein the pump wheel has a hub which is mounted rotatably on the protuberance and in which permanent magnets distributed over the hub's circumference are fastened.

6. The device as claimed in claim 3, wherein the pump wheel consists of a magnetizable plastic.

7. The device as claimed in claim 1, wherein the pump wheel is designed as an axial/radial wheel and a coolant inlet connection piece is arranged coaxially to the drive shaft.

8. The device as claimed in claim 2, wherein the protuberance consists of a nonmagnetizable material.

9. The device as claimed in claim 1, wherein the cooling chamber is formed from the cooling jacket and from a cover and is designed as a heat exchanger.

10. The device as claimed in claim 9, wherein the coolant outlet is arranged on the cooling chamber radially on the outside.

11. The device as claimed in claim 1, wherein the heat generation chamber is filled with a viscous medium, and in that the rotor together with the cooling jacket forms at least one operating gap in which the heat is generated by fluid friction.

12. A heating device for a motor vehicle, comprising:
a housing defining a heat generation chamber,
a drive shaft,
a rotor mounted in the heat generation chamber, wherein the rotor is driven by the drive shaft,
a cooling jacket defining a cooling chamber, wherein the housing and the cooling jacket are configured so that the heat generation chamber and the cooling chamber are immediately adjacent to one another in an axial direction of the heating device, and
a pump wheel driven by the drive shaft, wherein the pump wheel is arranged in the cooling chamber, axially adjacent to the heat generation chamber, and wherein the pump wheel is configured to circulate coolant in the cooling chamber,
wherein the cooling chamber is formed from the cooling jacket and from a cover, wherein the cooling jacket and/or the cover comprise cooling ribs that form cooling ducts for the coolant, wherein the cooling ducts run radially outward in approximate spirals from the pump wheel, and wherein the pump wheel is arranged longitudinally in a center of the spirals.

13. The device as claimed in claim 12, wherein the cooling jacket defines a central protuberance, wherein the central protuberance separates an axial end of the drive shaft from the pump wheel.

14. The device as claimed in claim 13, wherein the pump wheel is magnetically driven by the drive shaft.

15. The device as claimed in claim 12, wherein the cooling chamber extends in a radial direction of the heating device to substantially the same extent as the heat generation chamber, wherein the cooling chamber is axially adjacent to the heat generation chamber.

16. The device as claimed in claim 1, wherein an axial end of the drive shaft extends through a perforation in the cooling jacket,
wherein the axial end of the drive shaft is sealed to separate the heat generation chamber from the cooling chamber,
wherein the pump wheel is fastened to the axial end of the drive shaft in the cooling chamber.

17. The device as claimed in claim 2, wherein the cooling jacket separates the cooling chamber and the heat generation chamber.

* * * * *